United States Patent [19]
Miles et al.

[11] 4,397,473
[45] Aug. 9, 1983

[54] ROUGH TERRAIN VEHICLE

[75] Inventors: John A. Miles; James W. Rumsey; James J. Mehlschau, all of Davis, Calif.

[73] Assignee: The Regents of the University of California, Berkeley, Calif.

[21] Appl. No.: 293,972

[22] Filed: Aug. 18, 1981

[51] Int. Cl.³ ............................................. B60G 17/00
[52] U.S. Cl. ..................................... 280/6 H; 280/683; 280/709
[58] Field of Search .................. 280/6 H, 6 R, 6.1, 93, 280/104, 95 R, 96.1, 660, 663, 676, 683, 688, 690, 702, 704, 709, 714

[56] References Cited

U.S. PATENT DOCUMENTS

| | | | |
|---|---|---|---|
| 2,571,412 | 10/1951 | Bonnin | 280/104 |
| 2,842,326 | 7/1958 | Sharples | 280/683 |
| 2,847,228 | 8/1958 | Hall | 280/683 |
| 2,966,223 | 12/1960 | Gleasman | 280/683 |
| 3,298,709 | 1/1967 | Mercier | 280/6 R |
| 3,374,848 | 3/1968 | Castelet | 280/6 R |
| 3,539,197 | 11/1970 | Remand | 280/104 |

Primary Examiner—Robert R. Song
Attorney, Agent, or Firm—Lothrop & West

[57] ABSTRACT

A rough terrain vehicle has a frame for supporting lading and equipment especially adapted for off-road, rough country use. The frame is supported on four wheels through pivot arms and hydraulically interconnected expansible chambers subject to manual hydraulic control. The vehicle is preferably self-propelled by an engine that also drives the hydraulic mechanism.

4 Claims, 2 Drawing Figures

ROUGH TERRAIN VEHICLE

FIELD OF THE INVENTION

Embodiments of this invention are well adapted for use in transporting personnel and material on improved roads, but are especially for use off-road in hilly, hummocky, or otherwise rough, roadless terrain.

DESCRIPTION OF THE PRIOR ART

The applicants are familiar with round-wheel, off-road vehicles such as "jeeps", and with track-laying vehicles such as tractors and tanks, but they are not acquainted with devices, patents or publications having the features claimed herein. The various patents referred to in the record of this case are all substantially different from the claimed subject matter.

BRIEF SUMMARY OF THE INVENTION

A frame has a pair of trailing arms individually pivoted thereto about a common transverse axis, each trailing arm carrying a ground engaging wheel at its trailing end. Individually pivoted to the trailing arms are individual front supporting arms, each carrying a ground engaging wheel on its leading end. The front supporting arms and the frame in front are interrelated by individual, hydraulically expansible chambers cross interconnected into a hydraulic system. There are also hydraulically expansible chambers individually interconnecting each of the forward supporting arms and respective ones of the rearward trailing arms. These latter hydraulic chambers are also interconnected into the hydraulic system. Included in the hydraulic system are manual controllers so that the attitude of the frame with respect to the several ground engaging wheels can readily be regulated or can compensate for variations in terrain.

DETAILED DESCRIPTION

Figure 1:
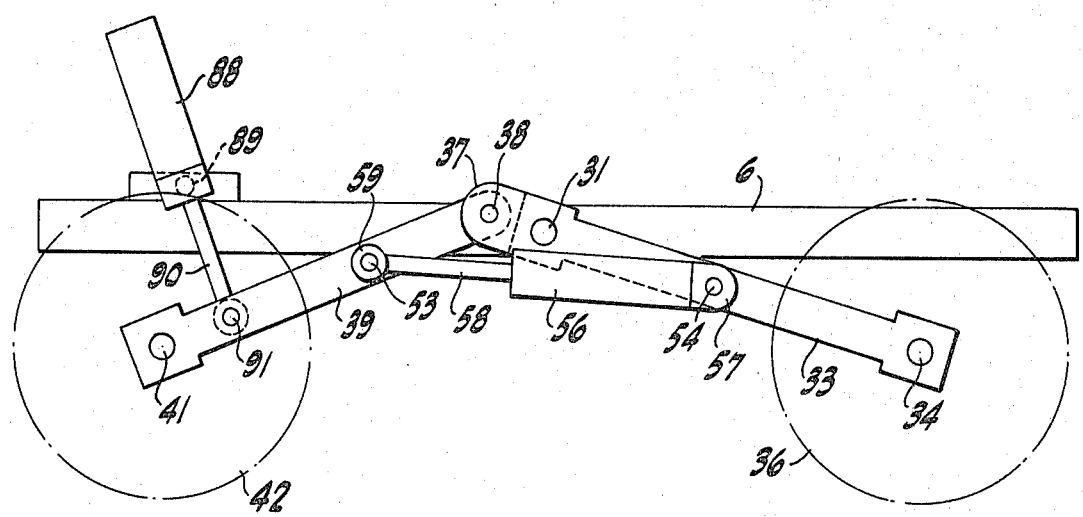
FIG. 1 is a side elevation of a vehicle pursuant to the invention, the showing being in diagrammatic form.
Figure 2:
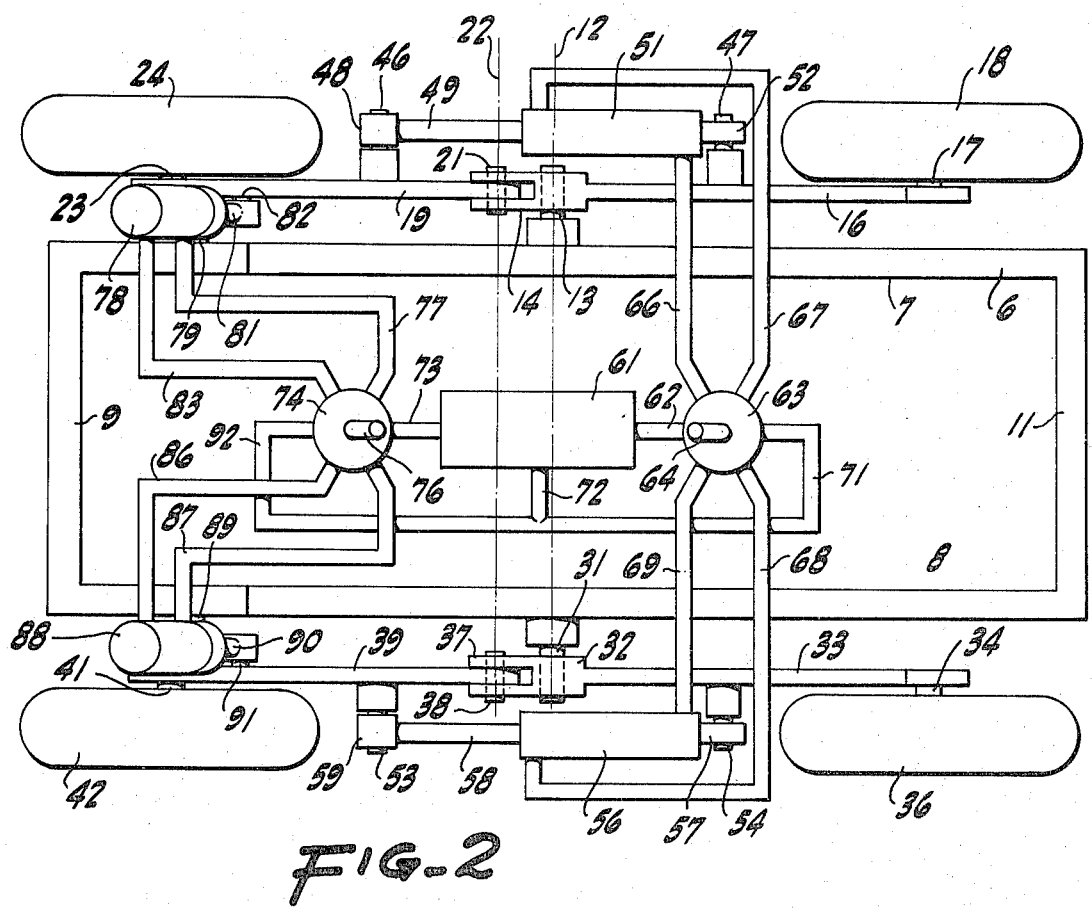
FIG. 2 is a plan of the vehicle pursuant to the invention, the plan being in diagrammatic form.

While the vehicle pursuant to the invention can be embodied in a large number of different ways, it has been constituted practically in a form as shown herein especially for use in rough terrain such as forests, hilly country and the like. In this version there is provided a main frame 6 comprised of a pair of parallel side rails 7 and 8 joined at the front by a cross-member 9 and at the rear by a cross-member 11. Extending from the side rail 7 co-axially with a transverse axis 12 is a pivot pin 13 on which is journalled the leading, forked end 14 of a right-rear, trailing support arm 16. The rear end of the trailing arm 16 carries an axle 17 on which a right-rear ground engaging wheel 18 is rotatably mounted.

The forked end 14 embraces the trailing end of a right-front supporting arm 19 and is secured for pivotal movement with respect to the forked end by means of a pivot pin 21. The pivot pin 21 is disposed with its own axis coincident with an axis 22 spaced from but parallel to the transverse axis 12. The right-front supporting arm 19 at its leading end carries an axle 23 rotatably supporting a right-front ground engaging wheel 24.

Disposed along the left-side of the frame 6 and parallel to the side rail 8 is a similar mounting arrangement. The side rail 8 carries a pivot pin 31 having its axis coincident with the transverse axis 12 and supporting a journal boss 32 at the leading end of a left-rear trailing arm 33. An axle 34 at the rear end of the left-rear trailing arm 33 serves as a mounting for a left-rear ground engaging wheel 36. The forward end of the journal boss 32 of the left-rear trailing arm 33 is formed as a fork 37 pivoted on a pivot pin 38 in line with the pivot pin 21 and concentric with the axis 22. On the pivot pin 38 is journalled the trailing end of a left-front supporting arm 39 at its leading end having an axle 41 serving as a mounting for a left-front ground engaging wheel 42.

For interrelating the ground engaging wheels individually and collectively with respect to the main frame 6, certain hydraulic circuitry and interconnections are afforded. Extending from the right-front supporting arm 19 is a stub shaft 46. Similarly, extending from the right-rear trailing arm 16 is a stub shaft 47. The stub shafts 46 and 47 have their axes parallel to the axes 12 and 22. Around the stub shaft 46 is a journal boss 48 at the end of a piston rod 49 extending from a hydraulically expansible side chamber 51. The chamber 51 has a journal boss 52, supported on the stub shaft 47.

In a similar fashion there extends from the left-front supporting arm 39 a stub shaft 53 parallel to the axes 12 and 22. A similar, parallel stub shaft 54 extends from the left-rear trailing arm 33.

Interconnecting the stub shafts 53 and 54 is a mechanism including a hydraulically expansible chamber 56 having a journal boss 57 mounted on the pin 54 and having a piston rod 58 with a journal boss 59 on the stub shaft 53.

So that the hydraulically expansible chambers 51 and 56 can be appropriately joined, there is hydraulic circuitry having a hydraulic supply 61. This includes a reservoir or tank and includes a power driven hydraulic pump (not shown) in the customary way. From the supply 61 a pressure line 62 extends to a control valve 63 that has a manual operator 64. This is effective to interconnect with a conduit 66 extending to one end of the chamber 51 and with a conduit 67 extending to the other end of the chamber 51.

Similarly, from the valve 63 there is a conduit 68 that extends to the one end of the chamber 56 and a conduit 69 that extends to the other end of the chamber 56. There is a return conduit 71 connecting the valve 63 to a return line 72 going to the tank of the hydraulic supply 61. In a comparable fashion there is a supply line 73 or pressure line from the pump of the hydraulic supply 61 leading to a second control valve 74 with an operating hand lever 76 thereon. A conduit 77 extends from the valve 74 to one end of a hydraulic chamber 78 having a connection 79 to the frame side rail and also having a projecting piston rod 81 journalled on a pin 82 on the right-front supporting arm 19. There is a second conduit 83 extending between the other end of the hydraulic chamber 78 and the control valve 74. Quite similarly there are conduits 86 and 87 extending between the control valve 74 and opposite ends of a hydraulic chamber 88. This has a connection 89 to the frame side rail 8 and has a piston rod 90 engaging a pin 91 connected to the left-front supporting arm 39. There is a return line 92 from the control valve 74 which extends to the return line 72 to the tank of the hydraulic supply 61.

With this arrangement, a driver riding on the vehicle, when the main propulsion engine (not shown) is in operation and is also driving the pump in the hydraulic supply 61, by controlling the manual operator 64 can regulate the supply of hydraulic fluid to the hydraulically expansible chambers 51 and 56 in any desired fashion. That is, he can release hydraulic fluid from one end of one chamber while supplying hydraulic fluid to the other end of such chamber. At the same time he can effect the hydraulic supply to and release from the other hydraulically expansible chamber. In this fashion the driver can not only change the pivotal relationship of the left-rear support arm 33 with respect to the frame side rails 7 and 8, but he can also change the relationship of the right-front supporting arm 19 with respect to the right-side trailing arm 16 and also with respect to the frame itself.

Similarly, by changing the volumetric distribution of the liquid in the hydraulically expansible chamber 56, the driver can vary the relative pivoted position of the left-side trailing arm 33 with respect to the frame 6 and similarly change the relative pivoted position of the left-front supporting arm 39 with respect to the left-rear trailing arm 33 and also with respect to the frame 6 itself.

In some instances the driver may decide to set one or both of the valves in a neutral position so that there is free flow of hydraulic fluid between the hydraulically expansible chambers 51 and 56 in any non-regulated fashion. In any case, the support of the frame 6 on the underlying terrain, no matter how varied in contour, can be appropriate to afford a suitable mounting or platform for materials carried or for operating tools such as saws, drills, and the like for use in rough terrain.

We claim:

1. A rough terrain vehicle comprising a frame extending forwardly and rearwardly, a left-rear trailing arm, means for pivotally connecting said left-rear trailing arm at the forward end portion thereof to said frame for rotation about a first transverse axis, a left-rear ground engaging wheel mounted on the rear end of said left-rear trailing arm, a left-front supporting arm, means for pivotally connecting the trailing end portion of said left-front supporting arm onto said left-rear trailing arm for rotation about a second transverse axis longitudinally spaced from said first transverse axis, a left-front ground engaging wheel mounted on the forward end portion of said left-front supporting arm, a left-front double acting hydraulically expansible chamber interconnected between said left-front supporting arm and said frame, a right-rear trailing arm, means for pivotally connecting said right-rear trailing arm at the forward end portion thereof to said frame for rotation about said first transverse axis, a right-rear ground engaging wheel mounted on the rear end portion of said right-rear trailing arm, a right-front supporting arm, means for pivotally connecting the trailing end portion of said right-front supporting arm on said right-rear trailing arm for rotation about said second transverse axis, a right-front ground engaging wheel mounted on the forward end portion of said right-front supporting arm, a right-front double acting hydraulically expansible chamber interconnected between said right-front supporting arm and said frame, a first double acting hydraulically expansible side chamber pivotally connected at opposite ends to said left-front supporting arm and said left-rear trailing arm, a second double acting hydraulically expansible side chamber interconnected between the right-front supporting arm and the right-rear trailing arm, a hydraulic pressure source and tank on said frame, hydraulic conduits on said frame for variously interconnecting said double acting expansible front chambers and side chambers to said source and to said tank, and manually controllable valving for controlling said conduits.

2. A rough terrain vehicle as in claim 1 in which said means for pivoting said rear trailing arms to said frame operates about a transverse axis rearwardly spaced from the second transverse axis about which the front supporting arms are pivoted to the rear trailing arms.

3. A rough terrain vehicle as in claim 1 in which said rear trailing arms at their forward end portions have forks in which said front supporting arms pivot.

4. A rough terrain vehicle as in claim 1 in which said left-front hydraulically expansible chamber and said right-front hydraulically expansible chamber are connected to said hydraulic source and tank by a single hand controller and said hydraulically expansible side chambers are connected to said hydraulic source and tank by a separate single hand controller.

* * * * *